(12) United States Patent
Li (10) Patent No.: US 11,884,488 B2
(45) Date of Patent: Jan. 30, 2024

(54) ARTICLE CONVEYING SYSTEM AND ARTICLE CONVEYING METHOD

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Hongtao Li, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 423 days.

(21) Appl. No.: 17/266,892

(22) PCT Filed: Jul. 30, 2019

(86) PCT No.: PCT/CN2019/098402
§ 371 (c)(1),
(2) Date: Feb. 8, 2021

(87) PCT Pub. No.: WO2020/042855
PCT Pub. Date: Mar. 5, 2020

(65) Prior Publication Data
US 2021/0323766 A1    Oct. 21, 2021

(30) Foreign Application Priority Data
Aug. 30, 2018  (CN) .......................... 201811001439.0

(51) Int. Cl.
*B65G 1/04* (2006.01)
*B65G 1/06* (2006.01)
(Continued)

(52) U.S. Cl.
CPC ........... *B65G 1/0492* (2013.01); *B65G 1/065* (2013.01); *B65G 47/52* (2013.01); *B65G 54/02* (2013.01);
(Continued)

(58) Field of Classification Search
CPC ...... B65G 1/0492; B65G 47/52; B65G 54/02; G06Q 10/083
See application file for complete search history.

(56) References Cited

U.S. PATENT DOCUMENTS 5,386,889 A  *  2/1995  Pipes ....................... B66B 5/22
                                                                188/67
7,381,022 B1    6/2008  King
(Continued)

FOREIGN PATENT DOCUMENTS

CN      1139410 A      1/1997
CN      101513962 A    8/2009
(Continued)

OTHER PUBLICATIONS

Chinese Office Action and Search Report dated Mar. 20 2020 in Patent Application No. 201811001439.0.
(Continued)

*Primary Examiner* — Saul Rodriguez
*Assistant Examiner* — Willie W Berry, Jr.
(74) *Attorney, Agent, or Firm* — Oblon, McClelland, Maier & Neustadt, L.L.P.

(57) ABSTRACT

The present disclosure relates to an article conveying system and an article conveying method. The article conveying system comprises: at least two first conveying channels configured to be arranged horizontally on a building; at least one second conveying channel configured to be arranged vertically on the building; a conveyer configured to move on the first conveying channels and the second conveying
(Continued)

channel to convey an article to different positions of the building; and transfer device arranged between the first conveying channels and the second conveying channel, to transfer the article and/or the conveyer from the first conveying channels to the second conveying channel or from the second conveying channel to the first conveying channels. The present disclosure can save physical strength and time of delivery persons and consignees, effectively achieve transfer of the article and/or the conveyer between the first conveying channels and the second conveying channel, and improve the conveying efficiency.

19 Claims, 6 Drawing Sheets (51) Int. Cl.
   B65G 47/52  (2006.01)
   B65G 54/02  (2006.01)
   G06Q 10/083 (2023.01)

(52) U.S. Cl.
   CPC ... G06Q 10/083 (2013.01); *B65G 2203/0283* (2013.01); *B65G 2203/0291* (2013.01)

(56) References Cited

U.S. PATENT DOCUMENTS

| | | | |
|---|---|---|---|
| 2012/0177465 A1* | 7/2012 | Koholka | B65G 1/0485 414/807 |
| 2014/0031972 A1 | 1/2014 | Dewitt et al. | |
| 2014/0257555 A1 | 9/2014 | Bastian, II et al. | |
| 2014/0277693 A1* | 9/2014 | Naylor | B65G 1/065 700/218 |
| 2016/0221757 A1 | 8/2016 | Dewitt et al. | |
| 2017/0369246 A1 | 12/2017 | Dewitt et al. | |
| 2018/0251302 A1 | 9/2018 | Valinsky et al. | |
| 2018/0346247 A1 | 12/2018 | Dewitt et al. | |
| 2020/0317447 A1 | 10/2020 | Dewitt et al. | |
| 2020/0324970 A1 | 10/2020 | Raizer et al. | |
| 2021/0139241 A1 | 5/2021 | Valinsky et al. | |
| 2022/0081212 A1 | 3/2022 | Dewitt et al. | |

FOREIGN PATENT DOCUMENTS

| | | |
|---|---|---|
| CN | 203283713 A | 11/2013 |
| CN | 103723495 A | 4/2014 |
| CN | 204801923 U | 11/2015 |
| CN | 205139984 U | 4/2016 |
| CN | 206679683 U | 11/2017 |
| CN | 107487689 A | 12/2017 |
| CN | 107539861 A | 1/2018 |
| CN | 107555104 A | 1/2018 |
| CN | 107651532 A | 2/2018 |
| DE | 957 200 | 1/1957 |
| DE | 93 20 592 U1 | 1/1995 |
| EP | 2 012 414 A2 | 1/2009 |
| JP | 61-88760 A | 5/1986 |
| JP | 3-238202 A | 10/1991 |
| JP | 2001-187620 A | 7/2001 |
| WO | WO 2013/155107 A1 | 10/2013 |
| WO | WO 2018/157095 A1 | 8/2018 |
| WO | WO 2019/130298 A1 | 7/2019 |

OTHER PUBLICATIONS

Chinese Office Action and Search Report dated Sep. 11, 2020 in Patent Application No. 201811001439.0
Chinese Office Action and Search Report dated Dec. 28, 2020 in Patent Application No. 201811001439.0
International Search Report dated Oct. 30, 2019 in PCT/CN2019/098402 filed on Jul. 30, 2019, 3 pages.
Extended European Search Report dated May 25, 2022 in European Patent Application No. 19854734.1, 10 pages.

* cited by examiner

ARTICLE CONVEYING SYSTEM AND ARTICLE CONVEYING METHOD

The present application is based on and claims priority to Chinese patent application No. 201811001439.0, filed on Aug. 30, 2018, the disclosure of which is hereby incorporated in its entirety.

FIELD OF THE INVENTION

The present disclosure relates to the field of logistics and transportation technology, in particular to an article conveying system and an article conveying method.

BACKGROUND OF THE INVENTION

With rapid development of online shopping, people are increasingly choosing to buy articles they need online, and articles that can be purchased online have gradually developed from daily necessities to electrical appliances, furniture, food, and other categories. This provides a lot of convenience for people's lives, but it also puts forward higher and higher requirements for delivery persons.

At present, in the case where it is convenient for a consignee to receive an article, a delivery person generally delivers the article directly to the consignee. However, there is often inconvenience for a consignee to receive an article, resulting in that a delivery person cannot successively deliver the article directly to the consignee, so the delivery person chooses to put the article purchased by the consignee at a pickup station to be picked up by the consignee, or put the article purchased by the consignee to a mail room of a building to be picked up by the consignee. Although this delivery mode saves physical strength and time of the delivery person, it causes complaints of the consignee, and also costs the consignee some energy and time to go downstairs and pick up the article.

Hence, whether the delivery person goes upstairs to deliver the article directly to the consignee, or the consignee goes to the pickup station or the mail room to pick up the article, it costs much physical strength and time.

It is to be noted that the information in the background section of the present disclosure is only intended to enhance understanding of the general background of the present disclosure, and should not be considered as an admission or any form of implication that the information constitutes the prior art well known to those skilled in the art.

SUMMARY OF THE INVENTION

Embodiments of the present disclosure propose an article conveying system and an article conveying method to solve the problem of consuming much physical strength and time of the consignee or delivery person in the delivery mode in the related art.

According to an aspect of the present disclosure, an article conveying system is provided, including:

at least two first conveying channels, configured to be arranged horizontally on a building;

at least one second conveying channel, configured to be arranged vertically on the building;

a conveyer, configured to move on the first conveying channels and the second conveying channel to convey an article to different positions of the building; and transfer device, arranged between the first conveying channels and the second conveying channel to transfer the article and/or the conveyer from the first conveying channels to the second conveying channel or from the second conveying channel to the first conveying channels.

In some embodiments, the transfer device includes:
a transfer channel, on which the conveyer moves; and
a first driving mechanism, configured to drive the transfer channel to turn over, so that the transfer channel is turned over from a position communicating with one of the first conveying channels to a position of communicating with the second transfer channel, or from the position communicating with the second conveying channel to the position of communicating with one of the first conveying channels.

In some embodiments, the first driving mechanism includes:
a rotating shaft, connected with the transfer channel; and
a driving member, an output shaft of which is connected to the rotating shaft to drive the rotating shaft to rotate.

In some embodiments, the transfer device further includes:
a mounting seat, configured to be installed on the building;
a bearing seat, mounted on the mounting seat; and
a bearing, an outer ring of which is mounted on the bearing seat, and an inner ring of which is connected to the rotating shaft.

In some embodiments, the conveyer is provided with a fixing device which fixes the article to prevent the article from slipping off.

In some embodiments, the fixing device includes a box, at least surfaces of the box configured to be perpendicular to an outer wall of the building being closed; or the fixing device includes a clamping claw for clamping the article.

In some embodiments, the article conveying system further includes:
a third conveying channel, configured to be arranged horizontally on the building to temporarily store at least one conveyer, and the transfer device being arranged between the third conveying channel and the second conveying channel.

In some embodiments, each of the first conveying channels and the second conveying channel includes a guide rail, and the conveyer includes guide wheels, which move along the guide rail.

In some embodiments, the guide wheels include:
a first guide wheel, an axial direction of which is parallel to a transverse direction of the conveyer; and
a second guide wheel, an axial direction of which is parallel to a vertical direction.

In some embodiments, the article conveying system further includes:
a set of electromagnets, configured to drive the conveyer to run on the first conveying channels and the second conveying channel.

In some embodiments, the set of electromagnets includes:
a first electromagnet and a second electromagnet, which are arranged on the conveyer; and
a plurality of third electromagnets provided on the first conveying channels and the second conveying channel and arranged successively along conveying directions of the first conveying channels and the second conveying channel;

at least two third electromagnets are provided between the third electromagnet directly facing the first electromagnet and the third electromagnet directly facing the second electromagnet, a magnetic pole of the third electromagnet closest to the first electromagnet is opposite to a magnetic pole of the first electromagnet, and a magnetic pole of the third electromagnet closest to the second electromagnet is same as a magnetic pole of the second electromagnet.

In some embodiments, a magnetic pole of the third electromagnet directly facing the first electromagnet is opposite to a magnetic pole of the first electromagnet, and a magnetic pole of the third electromagnet directly facing the second electromagnet is opposite to a magnetic pole of the second electromagnet.

In some embodiments, a plurality of storage areas for storing the article are configured to be located on the building, the article conveying system further including:

an article loading and unloading mechanisms, configured to load the article from the storage areas onto the conveyer or unload the article from the conveyer into the storage areas.

In some embodiments, the article loading and unloading mechanism includes:

a telescopic rod, arranged at a position on the first conveying channels corresponding to the storage area; and a second driving mechanism, configured to drive the telescopic rod to extend or retract relative to the storage area.

In some embodiments, a plurality of storage areas for storing the article are configured to be located on the building, the article conveying system further including:

a controller, for controlling a movement of the conveyer; and a first sensor, arranged at a preset distance from the storage area, configured to transmit a signal to the controller when detecting the conveyer, so that the controller controls the conveyer to start decelerating when the conveyer and the storage area are spaced apart by the preset distance, and stop moving when arriving at the storage area.

In some embodiments, the article conveying system includes two first sensors, and the two first sensors are respectively arranged upstream and downstream of the storage area at the preset distances therefrom to respectively detect the conveyers moving in different directions.

In some embodiments, a plurality of storage areas for storing an article are configured to be located on the building, the article conveying system further including:

a controller, configured to control the movement of the conveyer; and a second sensor, arranged at a position directly facing the storage area, configured to transmit a signal indicating the arrival of the conveyer to the controller when detecting the conveyer, the controller being configured to control the article loading and unloading mechanism to operate when receiving the signal indicating the arrival of the conveyer.

In some embodiments, the article conveying system further includes:

a protective hood, configured to protect the first conveying channels, the second conveying channel, the transfer device, and the conveyer.

In some embodiments, the article conveying system further includes:

a controller, configured to control the movement of the conveyer; and an information acquisition device, configured to acquire a destination information of the article and transfer the destination information to the controller, so that the controller controls the conveyer to transport the article to a destination.

According to another aspect of the present disclosure, an article conveying method is provided, including:

providing first conveying channels configured to be arranged horizontally on a building and a second conveying channel configured to be arranged vertically on the building;

conveying an article to different positions of the building through a movement of a conveyer on the first conveying channels and the second conveying channel; and driving, by a transfer device, the article and/or the conveyer to turn over, to transfer the article and/or the conveyer from the first conveying channels to the second conveying channel or from the second conveying channel to the first conveying channels.

Based on the above technical solutions, in embodiments of the present disclosure, by arranging the first conveying channels and the second conveying channel on the building, the conveyer can move on the first conveying channels and the second conveying channel to achieve the purpose of conveying the article to different positions of the building. A delivery person does not need to go upstairs to deliver the article directly to a consignee, nor does the consignee need to go to a pickup location or a mail room to pick up the article, thereby saving physical strength and time of the delivery person and the consignee, not only increasing the delivery efficiency of the delivery person, but also improving the receipt experience of the consignee and reducing complaints of the consignee; moreover; the transfer device is also provided in embodiments of the present disclosure, and the transfer device can achieve the transfer of the article and/or the conveyer between the first conveying channels and the second conveying channel, thereby effectively improving the conveying efficiency. This transfer mode is also convenient and fast, and high in transfer efficiency and transfer accuracy.

Other features and advantages of the present disclosure will become apparent from the following detailed description of exemplary embodiments of the present disclosure with reference to the accompanying drawings.

BRIEF DESCRIPTION OF THE DRAWINGS

To describe technical solutions in the embodiments of the present disclosure or in the related art more clearly, a brief introduction to the drawings for use in description of the embodiments or the related art will be given below. Obviously, the drawings in the following description only illustrate some embodiments of the present disclosure, and other drawings may also be obtained by those of ordinary skill in the art based on the drawings provided herein without creative work.

DETAILED DESCRIPTION OF THE EMBODIMENTS

The technical solutions in the embodiments will be described clearly and completely below in conjunction with the accompanying drawings in the embodiments of the present disclosure. Obviously, the described embodiments are only a part of the embodiments of the present disclosure, and not all the embodiments. Based on the embodiments of the present disclosure, all other embodiments obtained by those of ordinary skill in the art without creative work shall fall within the protection scope of the present disclosure.

In description of the present disclosure, it should be understood that orientation or position relations denoted by the terms "center", "transverse", "longitudinal", "front", "rear", "left", "right", "upper", "lower", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be understood as limiting the protection scope of the present disclosure.

Figure 1:
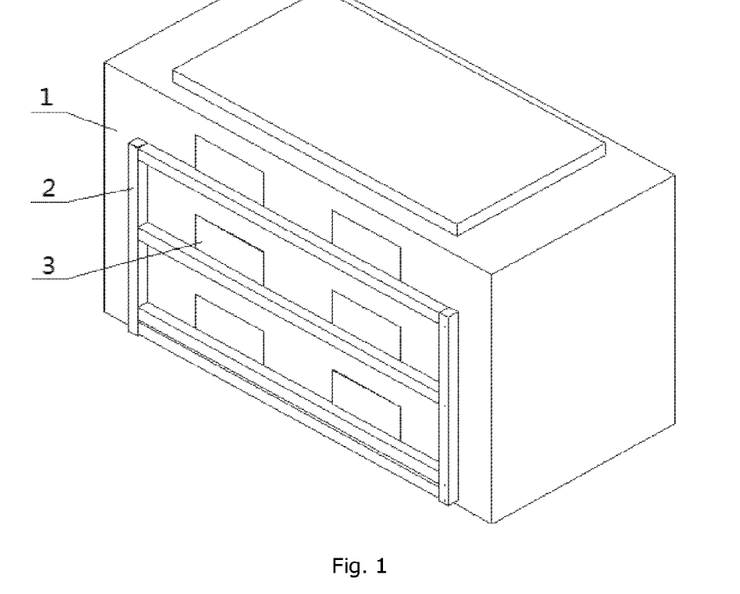
FIG. 1 is a schematic structural diagram of an embodiment of an article conveying system of the present disclosure.
Figure 2:
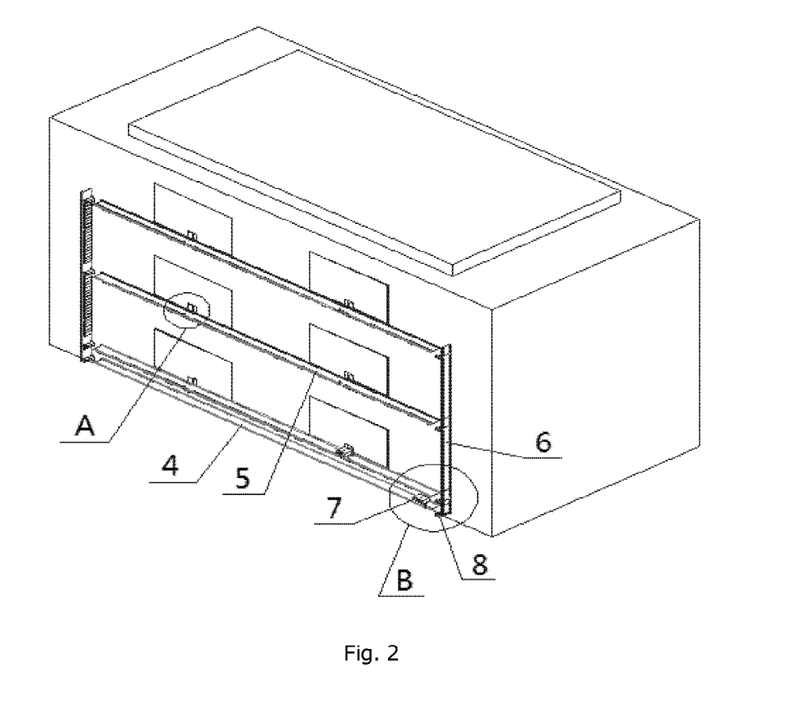
FIG. 2 is a schematic structural diagram of the embodiment of FIG. 1 after a protective hood is removed.

Referring to FIGS. 1, 2 and 13, in an illustrative embodiment of an article conveying system provided by the present disclosure, the article conveying system includes first conveying channels 5, a second conveying channel 6, a conveyer 7, and transfer device 8, wherein the number of the first conveying channels 5 is at least two, and the first conveying channels 5 are configured to be arranged horizontally on a building 1; the number of the second conveying channel 6 is at least one, and the second conveying channel 6 is configured to be arranged vertically on the building 1; the conveyer 7 is configured to move on the first conveying channels 5 and the second conveying channel 6 to convey an article 13 to different positions of the building 1; the transfer device 8 is arranged between the first conveying channels 5 and the second conveying channel 6, to drive the article 13 and/or the conveyer 7 to turn over, to transfer the article 13 and/or the conveyer 7 from the first conveying channels 5 to the second conveying channel 6 or from the second conveying channel 6 to the first conveying channels 5.

In the above illustrative embodiment, by arranging the first conveying channels 5 and the second conveying channel 6 on the building 1, the conveyer 7 can move on the first conveying channels 5 and the second conveying channel 6 to achieve the purpose of conveying the article 13 to different positions of the building 1. A delivery person does not need to go upstairs to deliver the article directly to a consignee, nor does the consignee need to go to a pickup location or a mail room to pick up the article, thereby saving physical strength and time of the delivery person and the consignee, not only increasing the delivery efficiency of the delivery person, but also improving the receipt experience of the consignee and reducing complaints of the consignee; moreover, the transfer device 8 is also provided in the embodiment of the present disclosure, and the transfer device 8 can cause the article 13 and/or the conveyer 7 to turn over, to achieve the transfer of the article 13 and/or the conveyer 7 between the first conveying channels 5 and the second conveying channel 6, thereby effectively improving the conveying efficiency. This transfer mode is also convenient and fast, and high in transfer efficiency and transfer accuracy.

Specifically, the number of the first conveying channels 5 may be determined according to the number of floors included in the building 1, and one of the first conveying channels 5 may be provided correspondingly outside each floor. The number of the second conveying channel 6 may be, but not limited to, two, and they are respectively arranged on two sides of the building 1. The number of the transfer device 8 may be determined according to the number of the first conveying channels 5 and the second conveying channels 6, and one transfer device 8 can be provided respectively between two ends of each of the first conveying channels 5 and the second conveying channels 6 on the left and right sides.

Initially, the conveyer 7 can be placed on the lowermost one of the first conveying channels 5. In the case where a destination of the article 13 is on the second floor or above, the transfer device 8 arranged at an end of the lowermost one of the first conveying channels 5 is configured to transfer the article 13 and/or the conveyer 7 from the first conveying channels 5 to the second conveying channel 6; when arriving at the corresponding floor, the transfer device 8 arranged at an end of one of the first conveying channels 5 on that floor is configured to transfer the article 13 and/or the conveyer 7 from the second conveying channel 6 to the one of the first conveying channels 5; in a returning process after delivery of the article 13, the transfer device 8 arranged at an end of the one of the first conveying channels 5 on the floor is configured to transfer the article 13 and/or the conveyer 7 from the one of the first conveying channels 5 to the second conveying channel 6; when arriving at the first floor, the transfer device 8 arranged at an end of the lowermost one of the first conveying channels 5 is configured to transfer the article 13 and/or the conveyer 7 from the second conveying channel 6 to the lowermost one of the first conveying channels 5.

The embodiment of the article conveying system provided by the present disclosure can be configured to transport an article 13 to different floors from below, and can also transport article 13 to be transported from different floors to below.

In an embodiment of the article conveying system of the present disclosure, the transfer device 8 may be configured to drive the article 13 to turn over, to transfer the article 13 from the conveyer 7 located on the first conveying channels 5 to the conveyer 7 located on the second conveying channel 6. The transfer device 8 may also be configured to drive the conveyer 7 to turn over. After the conveyer 7 is turned over, the article 13 placed on the conveyer 7 may also be turned over to achieve the transfer of the article 13.

The specific structure of the transfer device 8 can be in various forms, so long as its function can be achieved.

Figure 3:
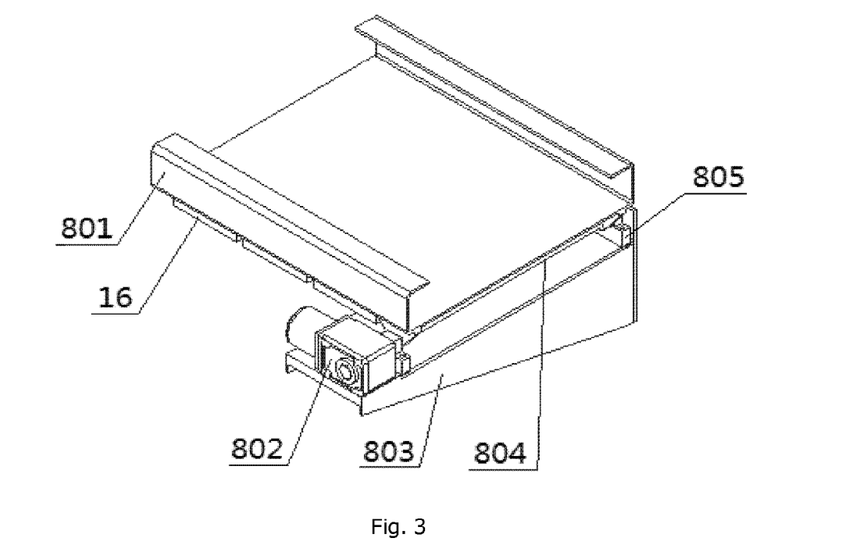
FIG. 3 is a schematic structural diagram of a third conveying channel in an embodiment of an article conveying system of the present disclosure.

In the embodiment shown in FIG. 3, the transfer device 8 includes a transfer channel 801 and a first driving mechanism, wherein the conveyer 7 moves on the transfer channel 801; the first driving mechanism is configured to drive the transfer channel 801 to turn over so that the transfer channel 801 is separated from the first conveying channels 5 and connected to the second conveying channel 6 or is separated from the second conveying channel 6 and connected to one of the first conveying channels 5.

Figure 4:
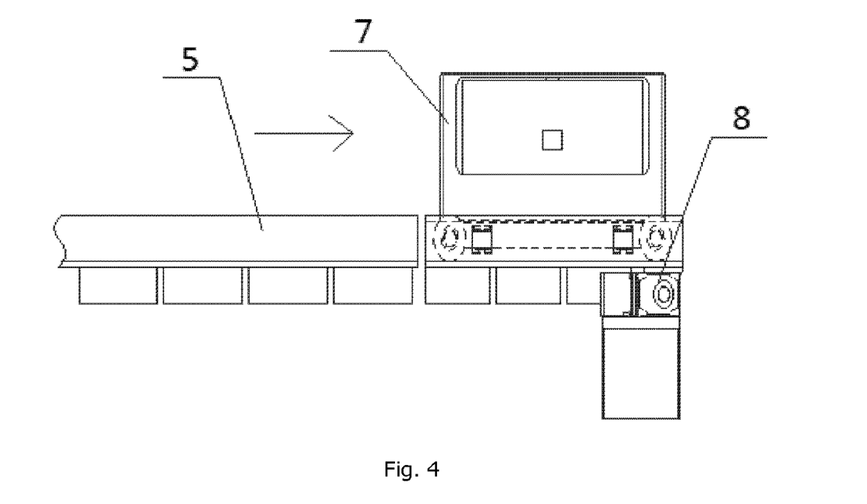
FIG. 4 is a schematic structural diagram of connection between a third conveying channel before turning-over and a first conveying channel in an embodiment of an article conveying system of the present disclosure.
Figure 5:
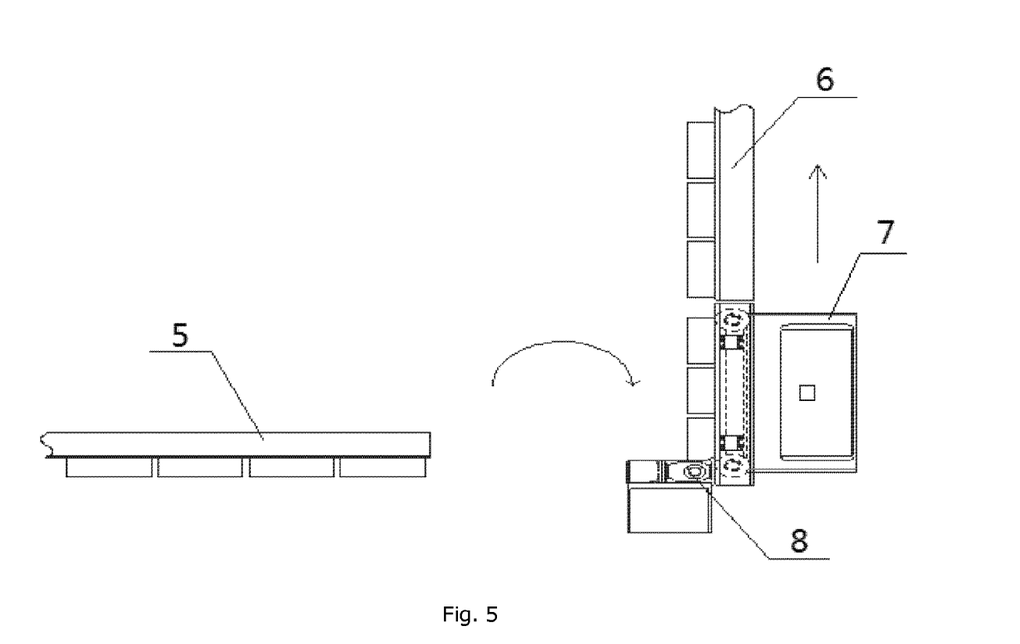
FIG. 5 is a schematic structural diagram of connection between a third conveying channel after turning-over and a second conveying channel in an embodiment of an article conveying system of the present disclosure.

As shown in FIG. 4, before the transfer channel 801 is turned over, the transfer channel 801 is docked with one of the first conveying channels 5; and as shown in FIG. 5, after the transfer channel 801 is turned over, the transfer channel 801 is docked with the second conveying channel 6.

Driving the transfer channel 801 by the first driving mechanism to turn over can cause both the conveyer 7 and the article 13 to turn over, to achieve the transfer of the article 13, so that the transfer efficiency is improved, and the transfer accuracy is also relatively high. This implementation of transfer by turning over can also avoid failures during the transfer of the conveyer 7, which affects the transfer efficiency.

The first driving mechanism includes a rotating shaft 804 and a driving member 802, wherein the rotating shaft 804 is connected to the transfer channel 801, and an output shaft of the driving member 802 is connected to the rotating shaft 804 to drive the rotating shaft 804 to rotate. When the output shaft of the driving member 802 rotates, the rotating shaft 804 is caused to rotate, and the rotation of the rotating shaft 804 causes the transfer channel 801 to rotate, thereby achieving the turning-over.

The transfer device 8 further includes a mounting seat 803, a bearing and a bearing seat 805, wherein the mounting seat 803 is configured to be installed on the building 1; the bearing seat 805 is mounted on the mounting seat 803; and an outer ring of the bearing is mounted on the bearing seat 805, and an inner ring of the bearing is connected to the rotating shaft 804.

The driving member 802 may also be mounted on the mounting seat 803, and the driving member 802 may be a motor or other power component.

In the above embodiments, when the conveyer 7 moves from the first floor to the second floor or higher target floors or from the second floor or higher target floors to the first floor, the transfer device 8 at the ends of the first conveying channels 5 on the second floor and the lower floor adjacent to the target floor and the floor(s) therebetween also functions to form the second conveying channel 6. That is, the transfer device 8 on the above-mentioned floors in this case needs to be turned over to positions docked with the second conveying channel 6 to form a continuous channel with the second conveying channel 6. In this case, in addition to the transfer function, the transfer device 8 also functions to form the second conveying channel 6.

In an embodiment of the article conveying system of the present disclosure, the conveyer 7 is provided with a fixing device to fix the article 13 to prevent the article 13 from slipping off.

As the conveyer 7 not only moves on the first conveying channels 5 arranged horizontally, but also moves on the second conveying channel 6 arranged vertically, the fixing device is provided to effectively prevent the article 13 from slipping off from the conveyer 7 to cause damage to the article 13.

Figure 6:
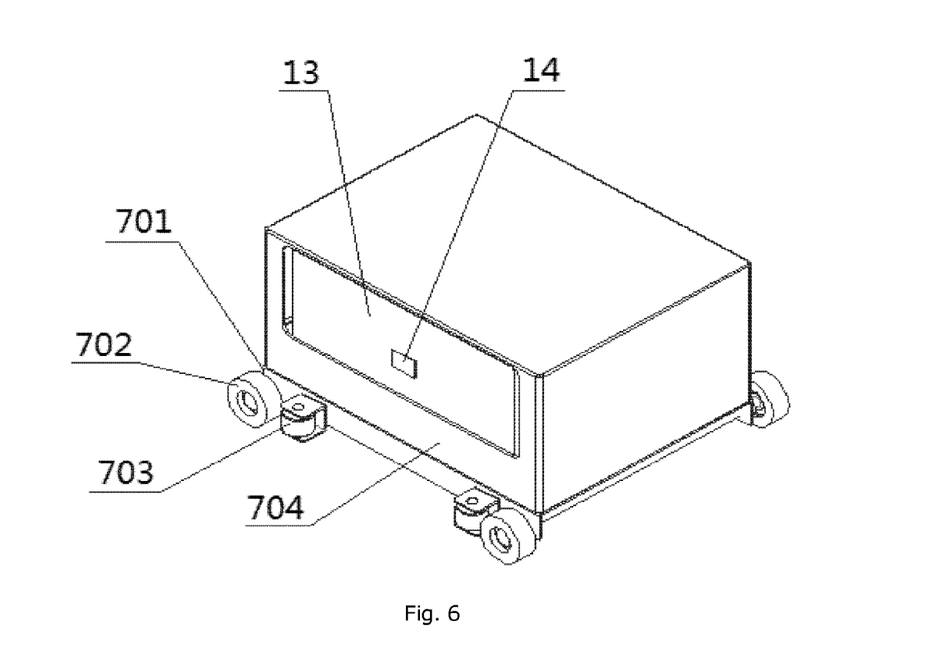
FIG. 6 is a schematic structural diagram of a conveyer in an embodiment of an article conveying system of the present disclosure.
Figure 7:
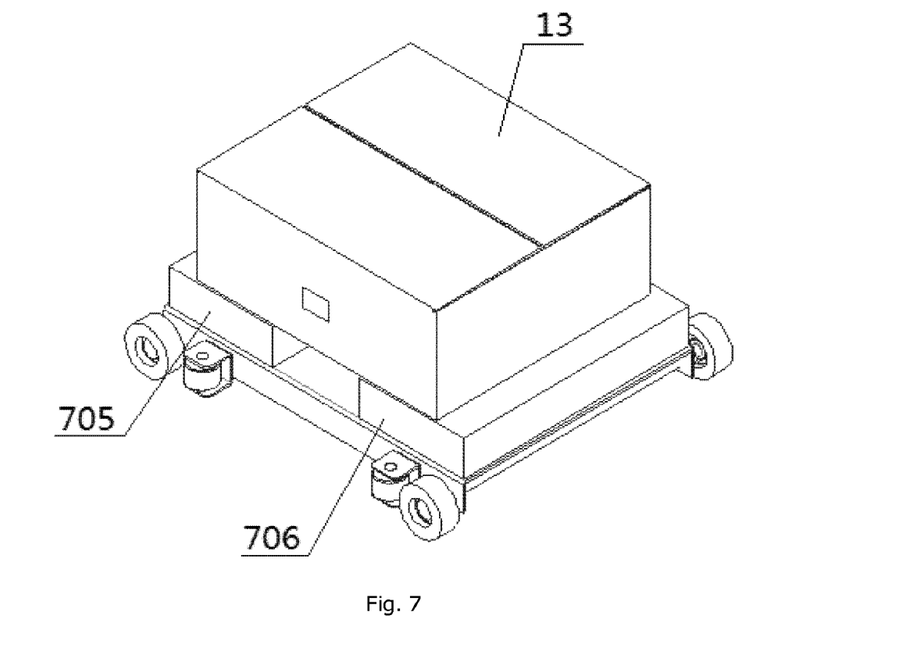
FIG. 7 is a schematic structural diagram of a conveyer after a box is removed therefrom in an embodiment of an article conveying system of the present disclosure.

As shown in FIGS. 6 and 7, the fixing device includes a box 704, at least surfaces of the box 704 configured to be perpendicular to an outer wall of the building 1 being closed. The box 704 so configured can ensure that the article 13 can be blocked from slipping off, whether on the first conveying channels 5 or on the second conveying channel 6. For example, when the box is placed on the conveyer 7, four surfaces of the box 704 that are configured to be perpendicular to the outer wall of the building 1 are closed, and front and back surfaces of the box that are configured to be parallel to the outer wall of the building 1 can be open, which can facilitate the loading and unloading of the article 13. The specific loading and unloading method will be described in detail below. This configuration can also reduce the overall weight of the box 704.

In other embodiments, the fixing device includes a clamping claw for clamping the article 13. When the article 13 need to be taken down, the clamping claw can be loosened to release a clamping force on the article 13.

As shown in FIG. 2, the article conveying system further includes a third conveying channel 4. The third conveying channel 4 is configured to be arranged horizontally on the building 1 to temporarily store at least one conveyer 7, and the transfer device 8 being arranged between the third conveying channel 4 and the second conveying channel 6. The conveyer 7 on the third conveying channel 4 is transferred to the second conveying channel 6 by the transfer device 8.

By providing the third conveying channel 4, a plurality of conveyers 7 can be temporarily stored on the third conveying channel 4. The plurality of conveyers 7 can run at the same time so long as their movement routes do not conflict, thereby increasing the conveying speed and improving the conveying efficiency.

The third conveying channel 4 may be arranged below the lowermost one of the first conveying channels 5 to facilitate the delivery person placing the article 13 onto the conveyer 7 or to facilitate the consignee taking away the article 13 from the conveyer 7.

In other embodiments, the third conveying channel 4 may also be arranged above the uppermost one of the first conveying channels 5 to facilitate delivering the article 13 to the conveyer 7 in the air or taking away the article 13 on the conveyer 7 in the air.

As shown in FIG. 6, each of the first conveying channels 5 and the second conveying channel 6 includes a guide rail, and the conveyer 7 includes guide wheels, which move along the guide rail. Through cooperation of the guide wheels and the guide rail, guidance of a movement route of the conveyer 7 can be achieved effectively.

The guide wheels include a first guide wheel 702 and a second guide wheel 703. An axial direction of the first guide wheel 702 is parallel to a transverse direction of the conveyer 7, and the first guide wheel is in contact with a bottom plane of the guide rail; and an axial direction of the second guide wheel 703 is parallel to a vertical direction, and the second guide wheel cooperates with a side surface of the guide rail to achieve sliding friction between the conveyer 7 and the side surface of the guide rail when the conveyer 7 adjusts its direction, to reduce resistance.

In an embodiment of the article conveying system of the present disclosure, the article conveying system further includes a set of electromagnets for driving the conveyer 7 to run on the first conveying channels 5 and the second conveying channel 6.

Figure 8:
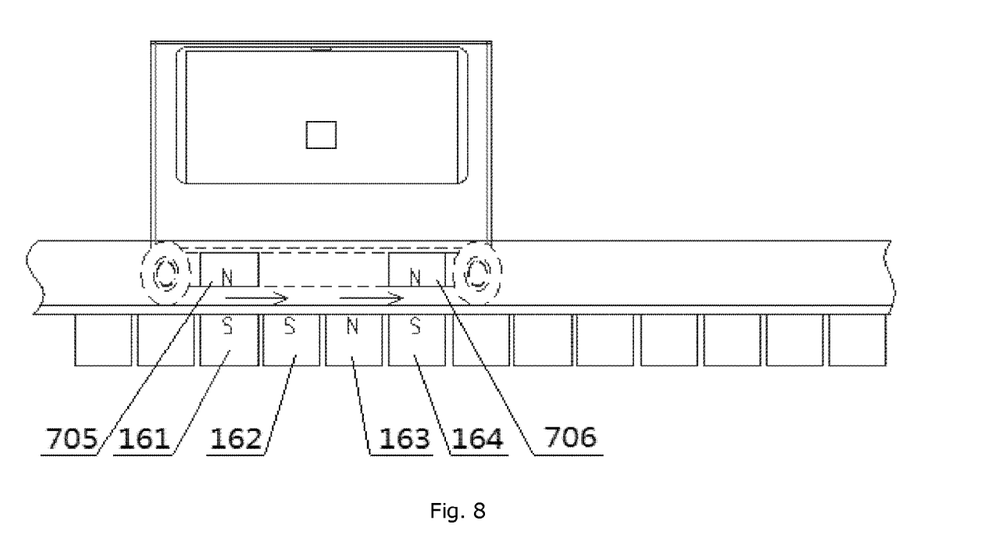
FIG. 8 is a schematic structural diagram of a conveyer moved to a first position in an embodiment of an article conveying system of the present disclosure.
Figure 9:
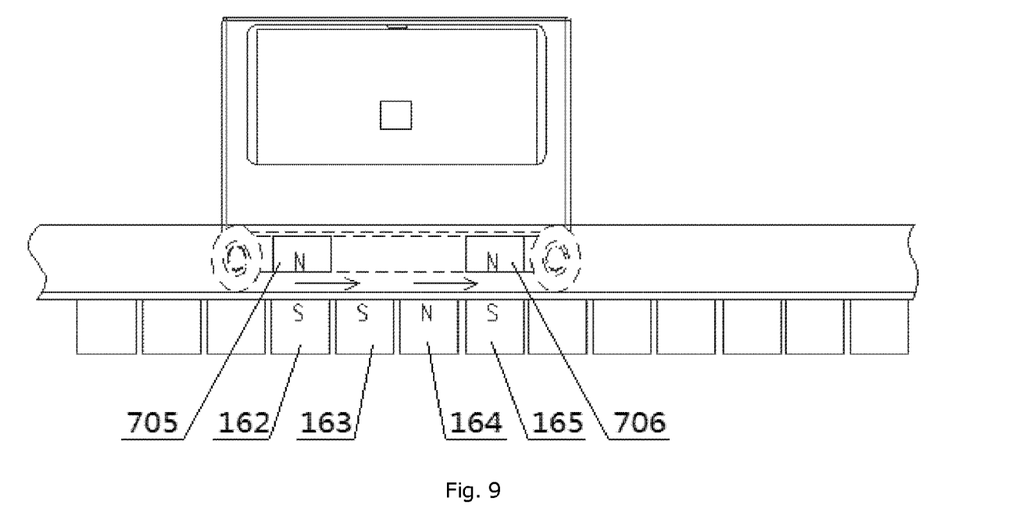
FIG. 9 is a schematic structural diagram of a conveyer moved to a second position in an embodiment of an article conveying system of the present disclosure.

Specifically, as shown in FIGS. 8 and 9, the set of electromagnets includes a first electromagnet 705, a second electromagnet 706 and a plurality of third electromagnets 16. The first electromagnet 705 and the second electromagnet 706 are arranged on the conveyer 7. The plurality of third electromagnets 16 are provided on the first conveying channels 5 and the second conveying channel 6 and arranged successively along conveying directions of the first conveying channels 5 and the second conveying channel 6. Of at least two third electromagnets 16 provided between the third electromagnet 16 directly facing the first electromagnet 705 and the third electromagnet 16 directly facing the second electromagnet 706, a magnetic pole of the third electromagnet 16 closest to the first electromagnet 705 is opposite to a magnetic pole of the first electromagnet 705, and a magnetic pole of the third electromagnet 16 closest to the second electromagnet 706 is same as a magnetic pole of the second electromagnet 706.

As shown in FIG. 8, when the conveyer 7 moves to a first position, the third electromagnet 16 directly facing the first electromagnet 705 is the first piece of third electromagnet 161, and the third electromagnet 16 directly facing the second electromagnet 706 is the fourth piece of third electromagnet 164. Between the first piece of third electromagnet 161 and the fourth piece of third electromagnet 164 are provided two third electromagnets 16, which are the second piece of third electromagnet 162 and the third piece of third electromagnet 163 respectively. Of the second piece of third electromagnet 162 and the third piece of third electromagnet 163, the one closest to the first electromagnet 705 is the second piece of third electromagnet 162, a magnetic pole of the second piece of third electromagnet 162 being opposite to the magnetic pole of the first electromagnet 705; and the one closest to the second electromagnet 706 is the third piece of third electromagnet 163, a magnetic pole of the third piece of third electromagnet 163 being same as the magnetic pole of the second electromagnet 706. In this way, there is an attractive force between the second piece of third electromagnet 162 and the first electromagnet 705, which causes the first electromagnet 705 to move in a direction toward the second piece of third electromagnet 162; and there is a repulsive force between the magnetic pole of the third piece of third electromagnet 163 and the second electromagnet 706, which drives the second electromagnet 706 to move in a direction away from the third piece of third electromagnet 163. Under the action of the two third electromagnets, the conveyer 7 moves in a direction from the first electromagnet 705 toward the second electromagnet 706.

As shown in FIG. 9, when the conveyer 7 moves to a second position, the third electromagnet 16 directly facing the first electromagnet 705 is the second piece of third electromagnet 162, and the third electromagnet 16 directly facing the second electromagnet 706 is the fifth piece of third electromagnet 165. Between the second piece of third electromagnet 162 and the fifth piece of third electromagnet 165 are provided two third electromagnets 16, which are the third piece of third electromagnet 163 and the fourth piece of third electromagnet 164 respectively. Of the third piece of third electromagnet 163 and the fourth piece of third electromagnet 164, the one closest to the first electromagnet 705 is the third piece of third electromagnet 163, a magnetic pole of the third piece of third electromagnet 163 being opposite to the magnetic pole of the first electromagnet 705; and the one closest to the second electromagnet 706 is the fourth piece of third electromagnet 164, a magnetic pole of the fourth piece of third electromagnet 164 being same as the magnetic pole of the second electromagnet 706. In this way, there is an attractive force between the third piece of third electromagnet 163 and the first electromagnet 705, which causes the first electromagnet 705 to move in a direction toward the third piece of third electromagnet 163; and there is a repulsive force between the fourth piece of third electromagnet 164 and the second electromagnet 706, which drives the second electromagnet 706 to move in a direction away from the fourth piece of third electromagnet 164. Under the action of the two third electromagnets, the conveyer 7 moves in a direction from the first electromagnet 705 toward the second electromagnet 706.

With continuous movement of the conveyer 7, the magnetic poles of the third electromagnets 16 change continuously, and the conveyer 7 can be driven to advance so long as the above requirement is met when the conveyer 7 moves to a certain position. Each third electromagnet 16 can be controlled individually in such a manner that the magnetic pole of the third electromagnet 16 can be changed with the direction of an input current; the magnitude of magnetism of the third electromagnet 16 can be adjusted by changing the magnitude of the input current, to adjust a moving speed of the conveyer 7; and the presence/absence of magnetism of the third electromagnet 16 is can be adjusted by the on/off of the input current, to adjust whether the conveyer 7 moves.

In an embodiment, three or more third electromagnets 16 may also be provided between the third electromagnet 16 directly facing the first electromagnet 705 and the third electromagnet 16 directly facing the second electromagnet 706, so long as it ensures that among these third electromagnet 16, the magnetic pole of the third electromagnet 16 closest to the first electromagnet 705 is opposite to the magnetic pole of the first electromagnet 705, and the magnetic pole of the third electromagnet 16 closest to the second electromagnet 706 is same as the magnetic pole of the second electromagnet 706, such that the conveyer 7 has a tendency to move in the direction from the first electromagnet 705 toward the second electromagnet 706. Of course, it is also possible that the magnetic pole of the third electromagnet 16 closest to the first electromagnet 705 is same as the magnetic pole of the first electromagnet 705, and the magnetic pole of the third electromagnet 16 closest to the second electromagnet 706 is opposite to the magnetic pole of the second electromagnet 706, such that the conveyer 7 can have a tendency to move in the direction from the second electromagnet 706 toward the first electromagnet 705.

The magnetic pole of the first electromagnet 705 and the magnetic pole of the second electromagnet 706 are same.

In other embodiments, the magnetic pole of the first electromagnet 705 and the magnetic pole of the second electromagnet 706 may also be opposite.

The magnetic pole of the third electromagnet 16 directly facing the first electromagnet 705 is opposite to the magnetic pole of the first electromagnet 705, and the magnetic pole of the third electromagnet 16 directly facing the second electromagnet 706 is opposite to the magnetic pole of the second electromagnet 706.

The advantage of this configuration is that the conveyer 7 can be attracted to the first conveying channels 5 and the second conveying channel 6 by the attractive forces between the first electromagnet 705 and the third electromagnet 16 directly facing it, and between the second electromagnet 706 and the third electromagnet 16 directly facing it, to prevent the conveyer 7 from slipping off when moving on the first conveying channels 5 and the second conveying channel 6. Especially when moving on the second conveying channel 6, the conveyer 7 can be effectively prevented from being unable to move upward due to too much gravity.

Figure 10:
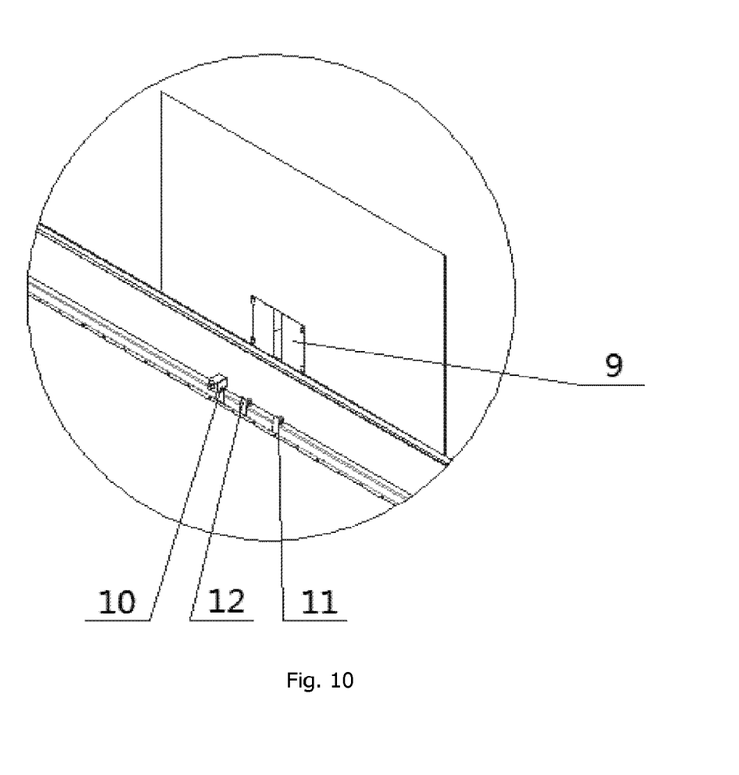
FIG. 10 is an enlarged view of a part denoted by sign A in FIG. 2.

As shown in FIGS. 1 and 10, a plurality of storage areas 9 for storing the article 13 are configured to be located on the building 1, the article conveying system further including an article loading and unloading mechanisms for loading the article 13 from the storage areas 9 onto the conveyer 7 or unloading the article 13 from the conveyer 7 into the storage areas 9.

By providing the article loading and unloading mechanisms, the article 13 can be automatically loaded and unloaded. A consignee does not need to be at home or receive the article in person. The article 13 can be automatically unloaded to the storage area 9 by article loading and unloading mechanism, and the consignee can take the article at any convenient time. Or a consignor does not need to wait for a collection person or the conveyer 7 to come and take away the article 13 before leaving. The consignor only needs to place the article 13 in the storage area 9 in advance, and the article 13 can be automatically loaded onto the conveyer 7 by the article loading and unloading mechanism. This breaks the restriction that the consignee and the delivery person, or the consignor and the collection person must be present at appointed time. The delivery person or the collection person does not need to contact the consignee or the consignor and appoint time in advance. Thus, the physical strength and time of the consignee or consignor, and the delivery person or collection person are greatly saved, and the user's article receiving or sending experience is improved.

Specifically, there may be various options for the specific structure of the article loading and unloading mechanism. For example, a mechanical gripper can be provided at the storage area 9. After the conveyer 7 arrives, the article 13 can be moved from the conveyer 7 to the storage area 9 or the article 13 can be transferred from the storage area 9 to the conveyer 7, by means of the mechanical gripper.

In the embodiment shown in FIG. 10, the article loading and unloading mechanism includes a telescopic rod 10 and a second driving mechanism. The telescopic rod 10 is arranged at a position on the first conveying channels 5 corresponding to the storage area 9, and the second driving mechanism is configured to drive the telescopic rod 10 to extend or retract relative to the storage area 9 to push the article 13 from the conveyer 7 into the storage area 9 during extension, or to take out the article 13 from the storage area 9 and load the article onto the conveyer 7 during retraction. The article loading and unloading mechanism of this structure is structurally simple, easy to control, and high in loading and unloading efficiency and reliability.

In the case where the conveyer 7 is provided with a box 704 whose four surfaces perpendicular to the outer wall of the building 1 are closed, and two surfaces parallel to the outer wall are open in structure, it can prevent the article 13 from slipping off, and can also facilitate loading or unloading the article 13 by means of the telescopic rod 10.

In other embodiments, the conveyer 7 may include a turnover pallet, and the article 13 are unloaded into the storage area 9 by turning over the pallet.

As shown in FIG. 10, the article conveying system further includes a controller and a first sensor 11. The controller is configured to control a movement of the conveyer 7. The first sensor 11 is arranged at a position of a preset distance from the storage area 9, and the first sensor 11 is configured to transmit a signal to the controller when detecting the conveyer 7, so that the controller controls the conveyer 7 to start decelerating, and stop moving when the conveyer 7 arrives at the storage area 9.

By providing the controller and the first sensor 11, a stop position of the conveyer 7 can be accurately controlled to provide a basis for operations of the article loading and unloading mechanism, and accurately load and unload the article 13 through cooperation with the article loading and unloading mechanism.

The article conveying system includes two first sensors 11. The two first sensors 11 are respectively arranged upstream and downstream of the storage area 9 at the preset distances therefrom to respectively detect the conveyers 7 moving in different directions. In this way, not only a conveyer 7 approaching the storage area 9 from the left, but also a conveyer 7 approaching the storage area 9 from the right can be detected, to adapt to the conveyers 7 moving in different directions.

The article conveying system may further includes a second sensor 12. The second sensor 12 is arranged at a position directly facing the storage area 9, to transmit a signal indicating the arrival of the conveyer 7 to the controller when detecting the conveyer 7. The controller can control the article loading and unloading mechanism to operate after receiving the signal indicating the arrival of the conveyer 7 to achieve loading and unloading of the article 13. For example, when the conveyer 7 arrives at the storage area 9, the controller controls the second driving mechanism to operate to drive the telescopic rod to extend, and the telescopic rod pushes the article 13 from the conveyer 7 into the storage area 9 during the extension, to achieve delivery of the article 13; or when the conveyer 7 arrives at the storage area 9, the controller controls the second driving mechanism to operate to drive the telescopic rod to retract, and the telescopic rod takes out the article 13 from the storage area 9 and loads the article onto the conveyer 7 during the retraction, to achieve collection of the article 13.

By providing the second sensor 12, the arrival of the conveyer 7 can be detected more accurately to ensure that the article loading and unloading mechanism starts to operate after the conveyer 7 really arrives, and avoid that the article 13 is unloaded to outside of the storage area 9 due to misoperation of the article loading and unloading mechanism.

In the above embodiments, the storage area 9 may be provided at a window 3 of each household user, or may be provided at other position close to the window 3, so long as it can facilitate the user taking and storing the article.

As shown in FIG. 1, the article conveying system may further includes a protective hood 2. The protective hood 2 is configured to protect the first conveying channels 5, the second conveying channel 6, the transfer device 8 and the conveyer 7.

Providing the protective hood 2 can prevent the first conveying channels 5, the second conveying channel 6, the transfer device 8 and the conveyer 7 from being affected by the external environment such as wind, sunlight or rain, and can also avoid influences on normal operation of the article conveying system by the external environment.

Figure 11:
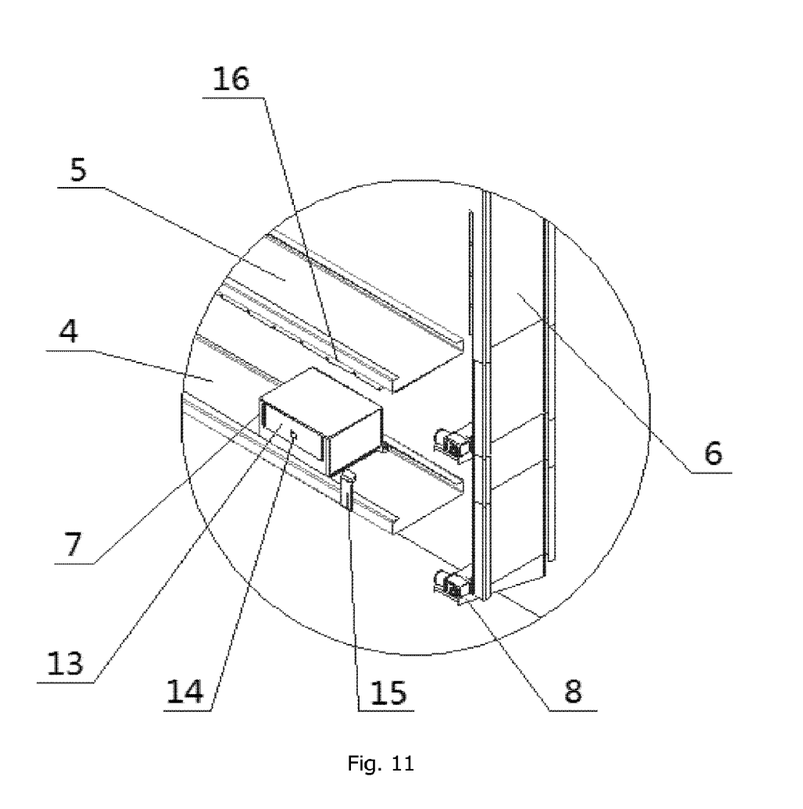
FIG. 11 is an enlarged view of a part denoted by sign B in FIG. 2.

As shown in FIG. 11, the article conveying system may further include an information acquisition device 15. The information acquisition device 15 is configured to acquire a destination information of the article 13, and transferring the destination information to the controller, so that the controller controls the conveyer 7 to convey the article 13 to a destination.

Specifically, the information acquisition device 15 may be a code reader, and correspondingly a barcode 14 is provided on the article 13, and the barcode 14 can be read by the code reader to obtain the destination information of the article 13. Of course, in other embodiments, the information acquisition device 15 may also be other apparatus that can read information. Of course, the article 13 may also be packed in a carton, and the barcode 14 is provided on the carton.

The present disclosure further proposes an article conveying method, the method including:

providing first conveying channels 5 configured to be arranged horizontally on a building 1 and a second conveying channel 6 configured to be arranged vertically on the building 1;

conveying article 13 to different positions of the building 1 through a movement of a conveyer 7 on the first conveying channels 5 and the second conveying channel 6; and driving, by a transfer device 8, the article 13 and/or the conveyer 7 to turn over, to transfer the article 13 and/or the conveyer 7 from the first conveying channels 5 to the second conveying channel 6 or from the second conveying channel 6 to the first conveying channels 5.

The positive technical effects of the article conveying system in the embodiments described above are also applicable to the article conveying method, and other settings in the article conveying system may also be applied to the article conveying method, which are not repeated here.

A working process of an embodiment of the article conveying system and the article conveying method of the present disclosure will be described below in conjunction with FIGS. 1-11:

In this embodiment, as shown in FIGS. 1 and 2, a building 1 includes three floors, each of which is provided with two windows 3. The article conveying system includes three first conveying channels 5, two second conveying channels 6 and one third conveying channel 4 arranged on an outer wall of the building 1. The first conveying channels 5 are arranged horizontally and correspond to the respective floors; the second conveying channels 6 are respectively arranged on the left and right sides of the building 1; and the third conveying channel 4 is arranged below the lowermost one of the first conveying channels 5. A set of transfer device 8 is respectively provided on the left and right ends of the third conveying channel 4 and each of the first conveying channels 5 to achieve the transfer between the channels. The article conveying system further includes a protective hood 2, which covers the outside of the first conveying channels 5, the second conveying channels 6 and the third conveying channel 4 to protect the first conveying channels 5, the second conveying channels 6 and the third conveying channel 4 and components arranged in the channels. Different numbers of conveyers 7 can be arranged on the third conveying channel 4 according to daily delivery volumes of different buildings.

As shown in FIG. 3, the transfer device 8 includes a transfer channel 801, a driving member 802, a mounting seat 803, a rotating shaft 804 and a bearing seat 805. The rotating shaft 804 is arranged at the bottom of the transfer channel 801, and the rotating shaft 804 is mounted on the bearing seat 805 by means of a bearing, with one end of the rotating shaft 804 being connected to an output shaft of the driving member 802.

As shown in FIG. 4, in a first position, the transfer device 8 is in a state of being connected with one of the first conveying channels 5. After the conveyer 7 moves to the transfer channel 801, the driving member 802 is activated to drive the rotating shaft 804 to rotate to cause the transfer channel 801 to be turned over, which in turn causes the conveyer 7 and the article 13 loaded on the conveyer 7 to be turned over; and as shown in FIG. 5, after being turned over, the transfer device 8 comes into a state of being connected with the second conveying channel 6, and the conveyer 7 can continue to move on the second conveying channel 6 to convey the conveyer 7 to a higher or lower floor.

As shown in FIGS. 6 and 7, the conveyer 7 includes a chassis 701, a first guide wheel 702, a second guide wheel 703, and a box 704. An axial direction of the first guide wheel 702 is parallel to a transverse direction of the conveyer 7. An axial direction of the second guide wheel 703 is parallel to a vertical direction. The first guide wheel 702 and the second guide wheel 703 are both arranged on the chassis 701. When the conveyer 7 moves on the first conveying channels 5 and the second conveying channels 6, four surfaces of the box 704 that are perpendicular to the outer wall are closed, and other two surfaces of the box that are parallel to the outer wall are open. The article 13 are placed in the box 704. A first electromagnet 705 and a second electromagnet 706 are further provided on the chassis 701.

As shown in FIGS. 8 and 9, magnetic poles of the first electromagnet 705 and the second electromagnet 706 are both N poles. When the conveyer 7 moves to a position shown in FIG. 8, a magnetic pole of the first piece of third electromagnet 161 directly facing the first electromagnet 705 is configured to be an S pole, a magnetic pole of the fourth piece of third electromagnet 164 directly facing the second electromagnet 706 is also configured to be an S pole, a magnetic pole of the second piece of third electromagnet 162 adjacent to the first piece of third electromagnet 161 is configured to be an S pole, and a magnetic pole of the third piece of third electromagnet 163 adjacent to the fourth piece of third electromagnet 164 is configured to be an N pole, such that the conveyer 7 can move in a direction from the first electromagnet 705 toward the second electromagnet 706. When the conveyer 7 moves to a position shown in FIG. 9, the magnetic pole of the second piece of third electromagnet 162 directly facing the first electromagnet 705 is configured to be an S pole, a magnetic pole of the fifth piece of third electromagnet 165 directly facing the second electromagnet 706 is also configured to be an S pole, the magnetic pole of the third piece of third electromagnet 163 adjacent to the second piece of third electromagnet 162 is configured to be an S pole, and the magnetic pole of the fourth piece of third electromagnet 164 adjacent to the fifth piece of third electromagnet 165 is configured to be an N pole, such that the conveyer 7 can continue moving in the direction from the first electromagnet 705 toward the second electromagnet 706. By continuously changing the magnetic poles of other third electromagnets 16 in a repeated manner; the conveyer 7 can be continuously pushed to run forward.

As shown in FIG. 10, a telescopic rod 10, a first sensor 11 and a second sensor 12 are provided on the first conveying channels 5. After detecting the arrival of the conveyer 7, the first sensor 11 transmits a signal to the controller. After receiving the signal from the first sensor 11, the controller controls the conveyer 7 to start decelerating. After detecting the arrival of the conveyer 7, the second sensor 12 transmits a signal to the controller. After receiving the signal from the second sensor 12, the controller controls the telescopic rod 10 to extend or retract. The article 13 can be pushed from the conveyer 7 into the storage area 9 during the extension, and the article 13 can be pulled from the storage area 9 into the conveyer 7 during the retraction.

As shown in FIG. 11, an information acquisition device 15 is provided at one end of the third conveying channel 4, and a barcode 14 is provided on the article 13. The barcode 14 can be scanned by the information acquisition device 15 to obtain a destination information corresponding to the article 13.

The working process of the article conveying system is described below by using delivery as an example.

First, a delivery person places a carton containing the article 13 with the barcode 14 into the conveyer 7 on the third conveying channel 4; then, the conveyer 7 is started to run to the information acquisition device 15, and the information acquisition device 15 scans the barcode 14 on the carton, reads the destination information of the article 13, and sends the destination information to the controller; next, the controller controls the conveyer 7 to run forward, and during the running, the transfer device 8 performs directional changeover between a horizontal first conveying channel 5 and the vertical second conveying channel 6 in the manner described above; when the conveyer 7 runs to the first sensor 11 provided at a target position of the article 13, the conveyer 7 starts to decelerate, and when it runs to the second sensor 12, the conveyer 7 stops moving; then, the telescopic rod 10 extends to push the article 13 on the conveyer 7 into the storage area 9 (a customer can get access to the storage area 9 through the window 3 to open an inner door of an article receiving box located in the storage area 9 and pick up the article at any time); and then, the telescopic rod 10 retracts, and the conveyer 7 continues to run forward and returns to an initial position on the third conveying channel 4 to wait for the next delivery task.

From the description of multiple embodiments of the article conveying system and the article conveying method of the present disclosure, it can be seen the embodiments of the article conveying system and the article conveying method of the present disclosure at least have one or more of the following advantages:

1. by arranging the first conveying channels and the second conveying channel on the building, the conveyer can move on the first conveying channels and the second conveying channel to achieve the purpose of conveying the article to different positions of the building, and a delivery person does not need to go upstairs to deliver the article directly to a consignee, nor does the consignee need to go to a pickup location or a mail room to pick up the article, thereby saving physical strength and time of the delivery person and the consignee, not only increasing the delivery efficiency of the delivery person, but also improving the receipt experience of the consignee and reducing complaints of the consignee;

2. the transfer device can cause the article and/or the conveyer to turn over, to achieve the transfer of the article and/or the conveyer between the first conveying channels and the second conveying channel, thereby effectively improving the conveying efficiency, and this transfer mode is also convenient and fast, and high in transfer efficiency and transfer accuracy;

3. by providing the fixing device on the conveyer, the article can be effectively prevented from slipping off;

4. by providing the third conveying channel, a plurality of conveyers can be temporarily stored, so that the plurality of conveyers can be conveyed at the same time, thereby improving the conveying efficiency; and 5. by providing the article loading and unloading mechanisms, the article can be automatically loaded and unloaded, and the consignee or consignor and the delivery person or collection person do not need to be present at the same time to accomplish a delivery or collection task, so the article delivery or collection efficiency is effectively increased, and the experience of the consignee or consignor is improved.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof without departing from the principle of the present disclosure; and such modifications and equivalent substitutions should be encompassed within the technical solutions sought for protection in the present disclosure.

The invention claimed is:

1. An article conveying system, comprising:
   at least two first conveying channels, configured to be arranged horizontally on a building;
   at least one second conveying channel, configured to be arranged vertically on the building;
   a conveyer, configured to move on the first conveying channels and the second conveying channel to convey an article to different positions of the building; and
   transfer device, arranged between the first conveying channels and the second conveying channel to transfer the article and/or the conveyer from the first conveying channels to the second conveying channel or from the second conveying channel to the first conveying channels,
   wherein the transfer device comprises:
   a transfer channel, on which the conveyer moves; and
   a first driving mechanism, configured to drive the transfer channel to turn over, so that the transfer channel is turned over from a first position communicating with one of the first conveying channels to a second position communicating with the second conveying channel, or from the second position communicating with the second conveying channel to the first position communicating with one of the first conveying channels.

2. The article conveying system according to claim 1, wherein the first driving mechanism comprises:
   a rotating shaft, connected with the transfer channel; and
   a driving member, an output shaft of which is connected to the rotating shaft to drive the rotating shaft to rotate.

3. The article conveying system according to claim 2, wherein the transfer device further comprises:
   a mounting seat, configured to be installed on the building;
   a bearing seat, mounted on the mounting seat; and
   a bearing, an outer ring of which is mounted on the bearing seat, and an inner ring of which is connected to the rotating shaft.

4. The article conveying system according to claim 1, wherein the conveyer is provided with a fixing device which fixes the article to prevent the article from slipping off.

5. The article conveying system according to claim 4, wherein the fixing device comprises a box, at least surfaces of the box configured to be perpendicular to an outer wall of the building being closed; or the fixing device comprises a clamping claw for clamping the article.

6. The article conveying system according to claim 1, further comprising:
   a third conveying channel, configured to be arranged horizontally on the building to temporarily store at least one conveyer, and the transfer device being arranged between the third conveying channel and the second conveying channel.

7. The article conveying system according to claim 1, wherein each of the first conveying channels and the second conveying channel comprises a guide rail, and the conveyer comprises guide wheels, which move along the guide rail.

8. The article conveying system according to claim 7, wherein the guide wheels comprise:
   a first guide wheel, an axial direction of which is parallel to a transverse direction of the conveyer; and
   a second guide wheel, an axial direction of which is parallel to a vertical direction.

9. The article conveying system according to claim 1, further comprising:
   a set of electromagnets, configured to drive the conveyer to run on the first conveying channels and the second conveying channel.

10. The article conveying system according to claim 9, wherein the set of electromagnets comprises:
   a first electromagnet and a second electromagnet, which are arranged on the conveyer; and
   a plurality of third electromagnets, provided on the first conveying channels and the second conveying channel and arranged successively along conveying directions of the first conveying channels and the second conveying channel;
   wherein at least two third electromagnets are provided between the third electromagnet directly facing the first electromagnet and the third electromagnet directly facing the second electromagnet, a magnetic pole of the third electromagnet closest to the first electromagnet is opposite to a magnetic pole of the first electromagnet, and a magnetic pole of the third electromagnet closest to the second electromagnet is same as a magnetic pole of the second electromagnet.

11. The article conveying system according to claim 10, wherein a magnetic pole of the third electromagnet directly facing the first electromagnet is opposite to a magnetic pole of the first electromagnet, and a magnetic pole of the third electromagnet directly facing the second electromagnet is opposite to a magnetic pole of the second electromagnet.

12. The article conveying system according to claim 1, wherein a plurality of storage areas for storing the article are configured to be located on the building, the article conveying system further comprising:
   an article loading and unloading mechanism, configured to load the article from the storage areas onto the conveyer or unload the article from the conveyer into the storage areas.

13. The article conveying system according to claim 12, wherein the article loading and unloading mechanism comprises:
   a telescopic rod, arranged at a position on the first conveying channels corresponding to the storage area; and
   a second driving mechanism, configured to drive the telescopic rod to extend or retract relative to the storage area.

14. The article conveying system according to claim 12, wherein a plurality of storage areas for storing article are configured to be located on the building, the article conveying system further comprising:
   a controller, configured to control movement of the conveyer; and
   a second sensor, arranged at a position directly facing the storage area, configured to transmit a signal indicating an arrival of the conveyer to the controller when detecting the conveyer, the controller being configured to control the article loading and unloading mechanism to operate when receiving the signal indicating the arrival of the conveyer.

15. The article conveying system according to claim 1, wherein a plurality of storage areas for storing the article are configured to be located on the building, the article conveying system further comprising:
   a controller, for controlling a movement of the conveyer; and
   a first sensor, arranged at a preset distance from the storage area, configured to transmit a signal to the controller when detecting the conveyer, so that the controller controls the conveyer to start decelerating when the conveyer and the storage area are spaced apart by the preset distance, and stop moving when arriving at the storage area.

16. The article conveying system according to claim 15, wherein the article conveying system comprises two first sensors, and the two first sensors are respectively arranged upstream and downstream of the storage area at the preset distance therefrom to respectively detect the conveyers moving in different directions.

17. The article conveying system according to claim 1, further comprising:
   a protective hood, configured to protect the first conveying channels, the second conveying channel, the transfer device and the conveyer.

18. The article conveying system according to claim 1, further comprising:
   a controller, configured to control movement of the conveyer; and
   an information acquisition device, configured to acquire a destination information of the article and transfer the destination information to the controller, so that the controller controls the conveyer to transport the article to a destination.

19. A article conveying method, comprising:
   providing first conveying channels configured to be arranged horizontally on a building and a second conveying channel configured to be arranged vertically on the building;
   conveying an article to different positions of the building through a movement of a conveyer on the first conveying channels and the second conveying channel; and
   driving, by a transfer device, the article and/or the conveyer to turn over, to transfer the article and/or the conveyer from the first conveying channels to the second conveying channel or from the second conveying channel to the first conveying channels;
   wherein the transfer device comprises:
   a transfer channel, on which the conveyer moves; and
   a first driving mechanism, configured to drive the transfer channel to turn over, so that the transfer channel is turned over from a first position communicating with one of the first conveying channels to a second position communicating with the second conveying channel, or from the second position communicating with the second conveying channel to the first position communicating with one of the first conveying channels.

* * * * *